the present invention;

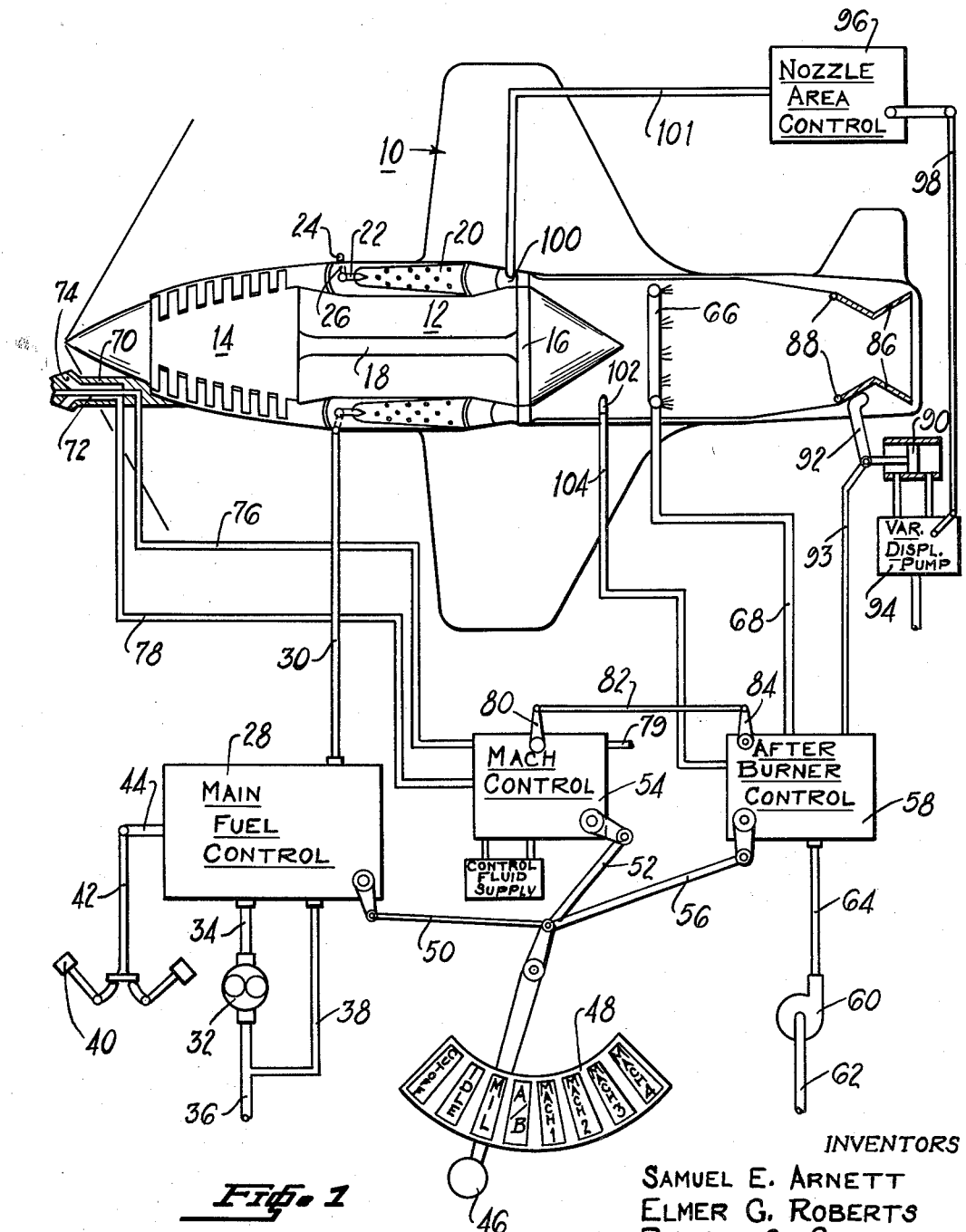

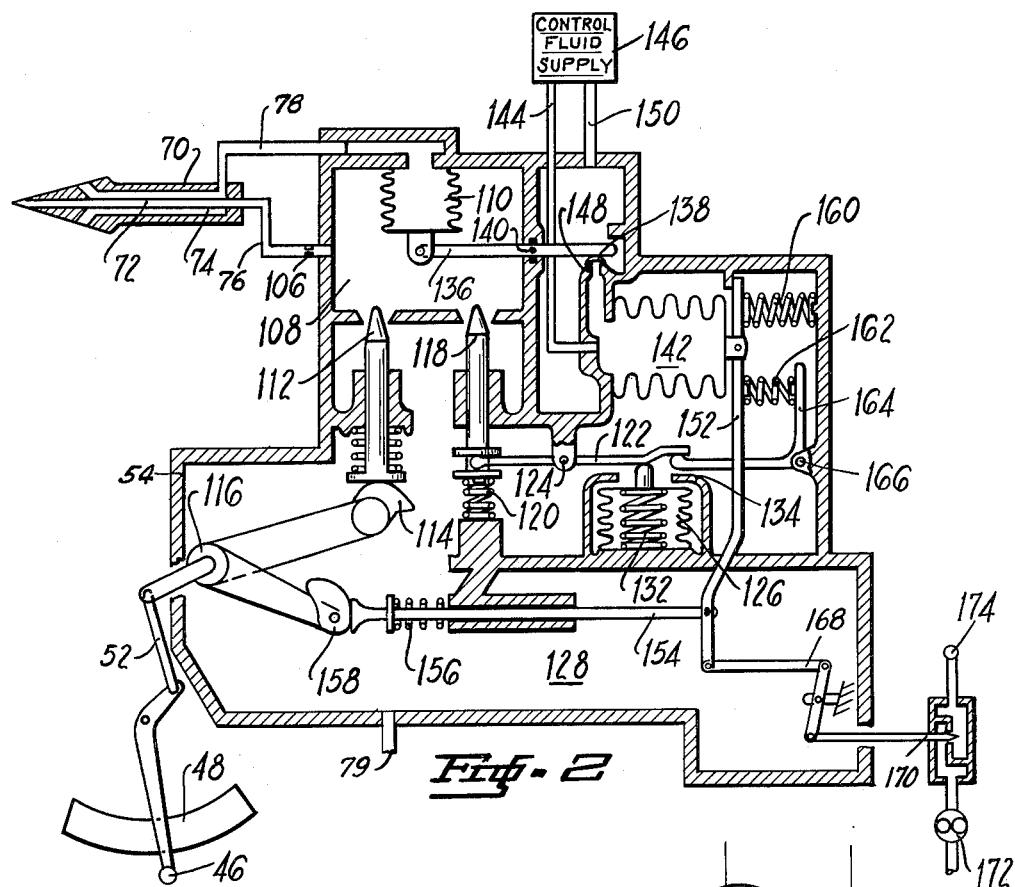
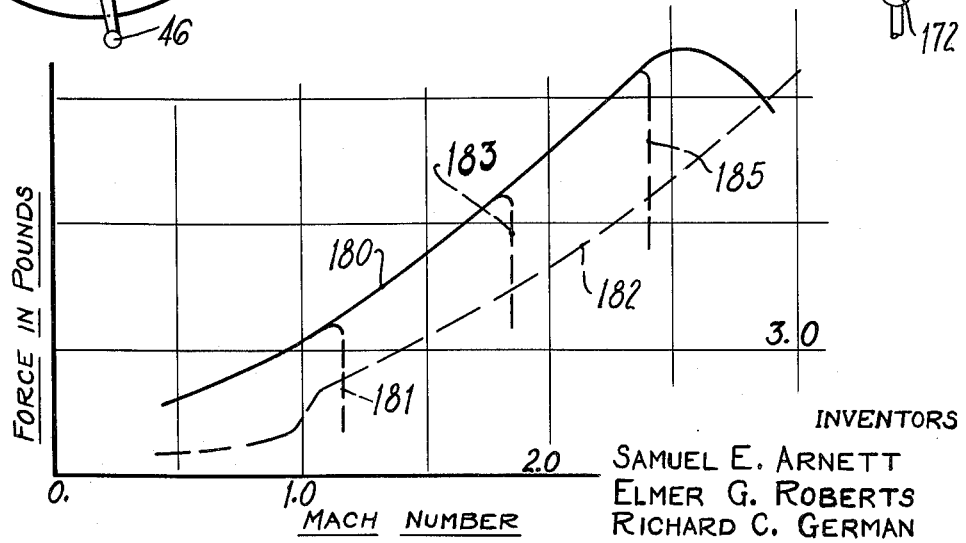
Fig. 3
INVENTORS
SAMUEL E. ARNETT
ELMER G. ROBERTS
RICHARD C. GERMAN
BY R.Y.Brodahl
ATTORNEY

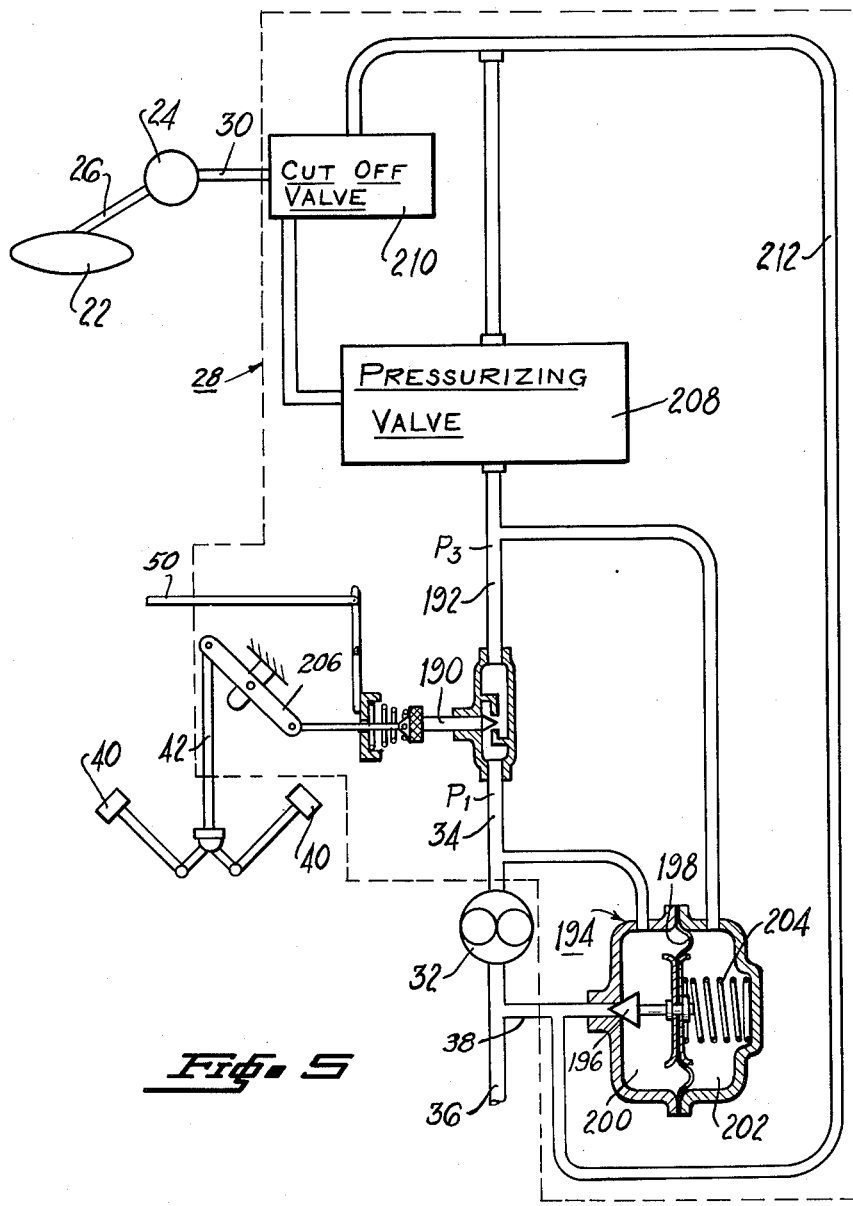

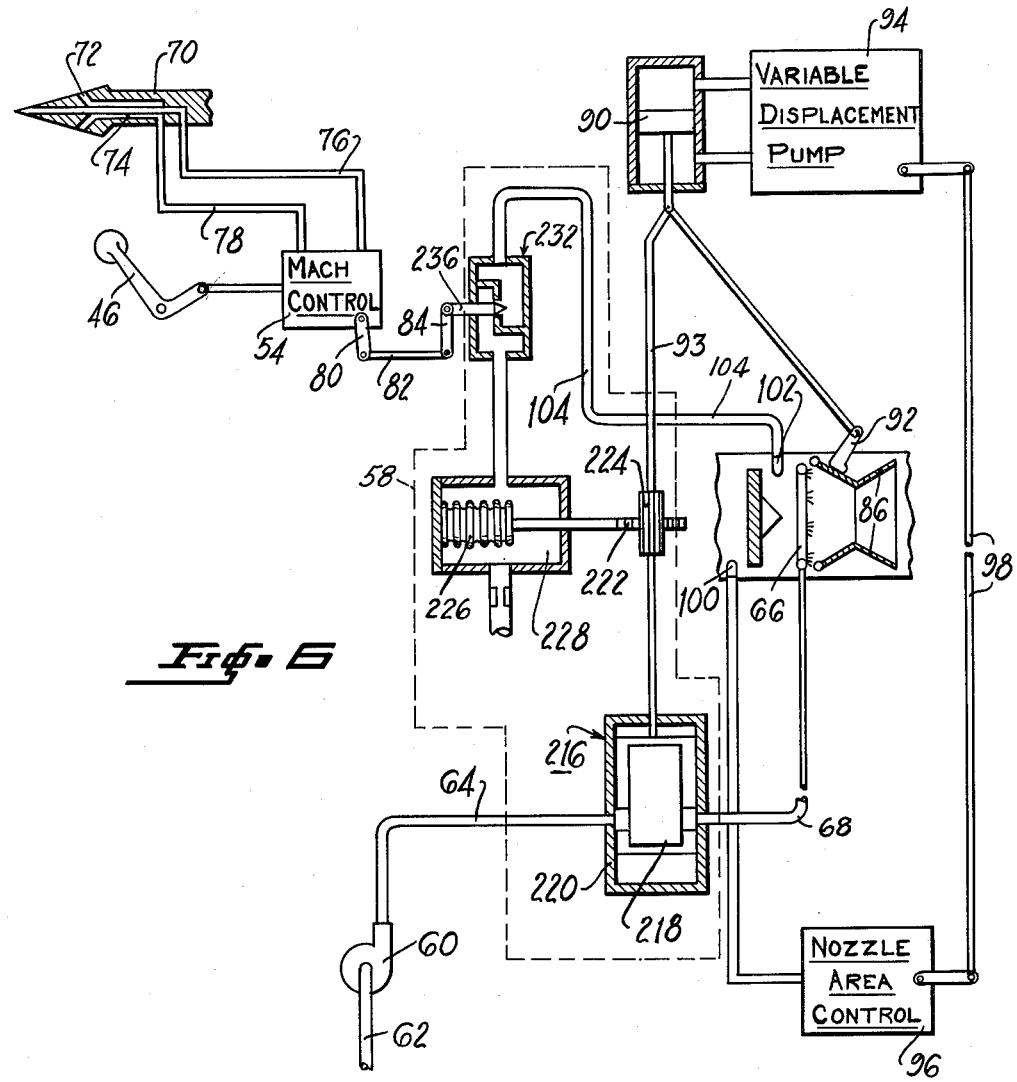

3,014,676
POWER CONTROL APPARATUS

Samuel E. Arnett, Elmer G. Roberts, and Richard C. German, South Bend, Ind., assignors to The Bendix Corporation, a corporation of Delaware
Filed Mar. 26, 1956, Ser. No. 573,995
11 Claims. (Cl. 244—76)

The present invention relates to fuel control apparatus for a prime mover such as a combustion engine, and more particularly to fuel control apparatus for a combustion engine having at least one fuel combustion chamber which engine is operative for propelling a vehicle such as an aircraft through a fluid medium such as air.

It is an object of the present invention to provide improved control apparatus for a combustion engine, which control apparatus is operative for controlling the operation of said combustion engine.

It is another object of the present invention to provide an improved fuel control apparatus for a gas turbine engine adapted for propelling an aircraft, which control apparatus is operative to supply fuel to said engine as a function of the propulsion speed of said aircraft.

It is a further object of the present invention to provide an improved control apparatus for a combustion jet engine for propelling an aircraft through air, which control apparatus is operative to control the fuel supplied to said engine as a function of the propulsion speed of said aircraft and/or the density of the air through which the aircraft is propelled.

It is a different object to provide improved control apparatus for an aircraft combustion engine having one or more combustion chambers, which apparatus is operative to supply fuel to said combustion chamber or chambers as a function of the propulsion speed of said aircraft as determined by the ram pressure and/or the cone or angular static pressure resulting from the movement of the aircraft through the air.

It is an additional object to provide an improved control apparatus for a combustion engine having one or more combustion chambers and a variable area exhaust nozzle, which control apparatus is operative to establish maximum power operation of the engine as a function of the nozzle area and a predetermined operative pressure of said engine.

It is still another object of the present invention to provide improved control apparatus for a combustion engine having at least a main fuel combustion chamber and an afterburner fuel combustion chamber, which control apparatus is operative to control the supply of fuel to the main combustion chamber as a function of a first engine operating parameter such as speed and to control the supply of fuel to the afterburner combustion chamber as a function of a second engine operating parameter such as the area of a variable area exhaust nozzle or the inlet pressure to the afterburner combustion chamber.

It is a still further object of the present invention to provide an improved control apparatus for a combustion engine, which engine is operative to propel a vehicle through a fluid medium, with said apparatus being operative to control the supply of fuel to the engine as a function of the propulsion speed of said aircraft through said fluid medium, such as air, and with said apparatus also being responsive to the density of said fluid medium adjacent the aircraft for controlling the supply of fuel to the engine as a function of said density.

It is a still different object of the present invention to provide an improved control apparatus for controlling the supply of fuel to a gas turbine engine, which engine is operative for propelling a vehicle through a fluid medium and which apparatus for this purpose is responsive to the propulsion speed of said vehicle, and/or is responsive to at least one engine operating parameter such as a temperature and/or a pressure at a predetermined location or section of said engine.

These and other objects and advantages will become apparent in view of the following description taken in conjunction with the drawings wherein:

FIGURE 1 is a schematic showing of a combustion engine including control apparatus in accordance with the present invention;

FIGURE 2 is a schematic illustration of the Mach control apparatus shown in FIGURE 1 with a modified interconnection to fuel controls 28 and 58;

FIGURE 3 is a curve chart illustrating the engine thrust and aircraft drag respectively as functions of flight speed or Mach number;

FIGURE 5 is a schematic showing of the main fuel control apparatus in accordance with the present invention;

FIGURE 6 is a schematic showing of the afterburner fuel control apparatus in accordance with the present invention.

Figure 4:
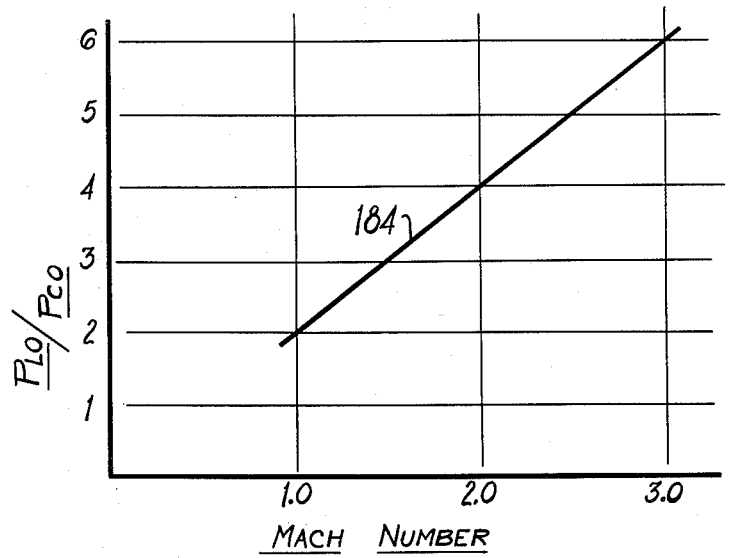
FIGURE 4 is a curve chart illustrating the ratio characteristic of the input control parameters or the ratio of the free stream impact pressure and the cone or angular static pressure as functions of flight speed or aircraft Mach number.

In FIGURE 1 there is shown an aircraft 10 including a combustion engine 12 of the gas turbine type. Said engine including a compressor 14 and a turbine 16 which are interconnected by a drive shaft 18. The gas turbine engine also includes a plurality of combustion chambers 20, each of which is supplied with fuel through a fuel nozzle 22 connected to a fuel supply manifold 24 having individual fuel lines 26 connected between the fuel supply manifold 24 and the fuel nozzles 22. A main fuel control apparatus 28 is connected to the fuel supply manifold 24 through a fuel conduit 30. A main fuel supply pump 32 is connected to supply fuel to the main fuel control 28 through a fuel conduit 34. An inlet fuel conduit 36 supplies fuel to the main fuel pump 32. A bypass fuel conduit 38 is connected between the main fuel control 28 and the inlet fuel conduit 36. Engine speed responsive fly weights 40 are connected through a linkage arm 42 to the input control arm 44 of the main fuel control 28.

A manual control throttle member 46 is operative with a control quadrant 48 and is connected through a first linkage arm 50 to the main fuel control 28, through a second linkage arm 52 to the Mach control 54, and through a third linkage arm 56 to the afterburner control 58. An afterburner fuel pump 60 is connected between an inlet conduit 62 and an outlet fuel conduit 64 connected to the afterburner control 58. The afterburner control is operative to control the supply of fuel to an afterburner fuel manifold 66 through a fuel conduit 68. The aircraft 10 carries a flight speed for Mach number sensing device 70 which includes a first chamber 72 having a pressure which is a function of the ram pressure or Pitot total pressure and a second chamber 74 which has a pressure that is a function of cone or angular static pressure. The first chamber 72 is connected through a conduit 76 to the Mach control 54 and the second chamber 74 is connected through a conduit 78 to the Mach control 54. An output arm 80 of the Mach control 54 is connected through a linkage arm 82 to an input arm 84 of the afterburner control 58. The gas turbine engine 12 includes the variable position exhaust nozzle gates 86 which are pivoted about support connections 88 and are moved by a control piston 90 through a connecting arm 92. An exhaust gate movement connection 93 is provided to the afterburner control 58. The position of the control piston 90 is determined by a variable displacement pump 94 which is controlled by a nozzle area control 96 through a connecting linkage 98, with the nozzle area control 96 being responsive to the inlet gas temperature of the turbine unit 16 as determined by a temperature responsive device 100, which latter device is connected to the nozzle area control 96 through connection 101. A pressure responsive device 102 is positioned to be responsive to the turbine exit pressure or the afterburner combustion chamber inlet pressure and the pressure responsive device 102 is connected to the afterburner control 58 through the conduit 104.

Referring to FIGURE 2 there is shown a schematic illustration of the Mach control apparatus 54 shown in FIGURE 1. In FIGURE 2 the Mach number or flight speed responsive device 70 is shown with its first chamber 72 connected through a fixed orifice member 106 disposed in conduit 76 to a first fluid chamber 108. The second chamber 74 of the flight speed or Mach number responsive device 70 is connected to the interior of a bellows member 110 through conduit 78 such that the interior of the bellows member 110 is responsive to the cone or angular static pressure and the exterior of the bellows member 110 which latter bellows member is positioned within the fluid chamber 108 is responsive to the free stream impact or ram pressure. A first control needle 112 is operative to vary the fluid pressure within the fluid chamber 108 as a function of the position of control throttle member 46 as supplied to vary the position of a first throttle cam 114 through the connecting arm 52 and the control mechanism 116. A second control needle 118 is operative to vary the fluid pressure within the fluid chamber 108, with the second control needle 118 being positioned relative to the compressive force of a compression spring 120 by a control arm 122 which is supported about support pivot 124. A second control bellows 126 is operative to control the position of the control arm 122, with the second control bellows 126 being positioned within a second fluid chamber 128, which second fluid chamber 128 includes an open conduit 79 such that the second fluid chamber is responsive to ambient static pressure and therefore varies as the flight altitude of the aircraft including the Mach control apparatus 54 shown in FIGURE. 2. The second control bellows member 126 has an evacuated interior which receives a control spring 132. A bellows stop 134 limits the maximum altitude at which the second control bellows member 126 is effective to control the position of the control arm 122.

The movement or output of the first control bellows member 110 is applied through a control lever 136 to control the position of the control valve 138. The control lever 136 is pivoted about support connection 140. The control valve 138 controls the fluid pressure within a third control bellows member 142. The interior of the third control bellows member 142 is supplied control fluid at a first pressure through an inlet fluid conduit 144 from a control fluid supply 146 which latter control fluid supply may comprise a pump or a pressurized supply. The interior of the third control bellows member is also connected through the valve seat 148 operative with the control valve 138 and an outlet fluid conduit 150 back to the control fluid supply 146. The movement or output of the third control bellows member 142 is applied through a control arm 152 which is pivotally supported by a support member 154 which latter support member is axially movable against a compression spring member 156 by a second throttle control cam 158. The latter second throttle control cam 158 is controlled and positioned by the control throttle member 46 through the linkage mechanism 116 as shown. The movement of the control arm 152 by the third control bellows member 142 is against the compressive force of a spring member 160. A second compressive spring member 162 is connected between one end of the control arm 152 and a bell crank 164, which latter bell crank is pivoted about the support connection 166 and is operative to position the control lever 122 which controls the position of the second needle valve 118. The second end of the control arm 152 is connected through a control linkage 168 to control the position of a control valve 170 for controlling the supply of fuel from the fuel pump 172 to the fuel manifold 174.

In this respect the fuel pump 172 may be either the main fuel pump 32 or the afterburner fuel pump 60 as shown in FIGURE 1 and the fuel supply manifold 174 may be either the fuel supply manifold 24 or the afterburner fuel manifold 66 as shown in FIGURE 1 so that in FIGURE 2 connection 168, valve 170 comprises a modified form of the connection 84 of FIGURE 1.

In FIGURE 3 there is shown a curve chart illustrating engine thrust as shown by curve 180 as a function of flight speed or Mach number, and showing vehicle drag as illustrated by curve 182 as a function of flight speed or Mach number. The curve chart of FIGURE 3 shows that the available thrust from a combustion engine such as the gas turbine engine 12 shown in FIGURE 1 is greater than the effective drag of the vehicle which is being propelled through a fluid medium such as an aircraft being propelled through air, which drag is illustrated by the curve 182.

The curve chart of FIGURE 4 illustrates the operation of the flight speed or Mach number sensing device 70 shown in FIGURE 1. The curve 184 shown in FIGURE 4 illustrates the relationship of the pressure ratio available from the flight speed or Mach number sensing device 70 as a function of flight speed or Mach number. More specifically, the pressure ratio of Pitot total pressure or ram pressure relative to cone or angular static pressure is plotted as the ordinate of the curve chart shown in FIGURE 4. For the purposes of the present invention any other pressure ratio indicative of Mach number could have been used with the Mach control 54 shown in FIGURE 1, or schematically illustrated in FIGURE 2, however the curve of FIGURE 4 shows that the actual condition of vehicle operation through the fluid medium such as flight speed or Mach number can clearly be sensed by the pressure ratio illustrated in FIGURE 4.

In FIGURE 5 there is a schematic showing of the main fuel control apparatus in accordance with the present invention, and more specifically the main fuel control 28 shown in FIGURE 1. The main fuel pump 32 is shown connected between the inlet fuel conduit 36 and the outlet fuel conduit 34. A metering or fuel flow control valve 190 is shown in position for controlling the flow of fuel between the outlet fuel conduit 34 and the fuel conduit 192. A by-pass regulator valve 194 is shown connected between the outlet fuel conduit 34 and the inlet fuel conduit 36. The valve member 196 is controlled in position by a control diaphragm 198 which is positioned between a first fluid chamber 200 containing fuel at the pump outlet pressure $B_1$ and a second fluid chamber 202 containing fuel at the outlet pressure $B_3$ of the metering valve 190 and within the fuel conduit 192. The fluid chamber 202 includes a compression spring member 204. The position of the metering valve 190 is controlled by the engine speed responsive flyweights 40 and throttle linkage 50 through the interconnecting control linkage 206 including the control arm 42 shown in FIGURE 1. The fuel conduit 192 is connected to the fuel nozzle 22 through the conventional pressurizing valve 208 and the cut-off valve 210 and the outlet fuel conduit 30, the fuel manifold 24 and the fuel conduit 26 as shown in FIGURE 1. The cut-off valve 210 and the pressurizing valve 208 are connected to pump inlet pressure $B_0$ through the fuel conduit 212 as is conventional practice.

In FIGURE 6 there is shown schematically the afterburner fuel control 58 as shown in FIGURE 1. In FIGURE 6 there is shown the control throttle member 46 connected to the Mach control 54. The free stream impact or ram pressure is supplied by the conduit 76 from the Mach number or propulsion speed sensing device 70 to the Mach control 54 and the cone or angular static pressure is supplied by the conduit 78 to the Mach control 54. The afterburner supply pump 60 is shown connected between the inlet fuel conduit 62 and the outlet fuel conduit 64. A metering or fuel flow control valve 216 is shown including a movable valve member 218 and a fixed position sleeve member 220. The valve member 218 is rotated through the rack 222 and the pinion member 224. The rack 222 is moved in position by a control bellows member 226 which is positioned within a fluid chamber 228. The control bellows member 226 is evacuated. A fluid pressure responsive device 102 as shown in FIGURE 1 is responsive to the turbine exit pressure or the afterburner combustion chamber inlet pressure and is connected through a conduit 104 to a pressure control valve 232, which is connected between the conduit 104 and the fluid chamber 228. The pressure control valve 232 includes a valve member 236, which is varied in position by the Mach control 54 through the interconnecting control arms 80, 82 and 84 as shown in FIGURE 1.

The control valve 218 is moved axially through the control member 93 by movement of the exhaust nozzle area control piston 90 which in turn controls the position of the exhaust nozzle gates 86 through the control arm 92. The variable displacement pump 94 controls the position of the control piston 90 as shown in FIGURE 1 in response to movement of the control arm 98 as determined by the nozzle area control 96 in response to the temperature responsive device 100.

The variable displacement pump 94 may be in accordance with the disclosure and description of such a pump in copending application Serial No. 568,630 filed February 29, 1956 by H. J. Williams and J. E. Hurtle and assigned to the same assignee as the present application.

Figure 7:
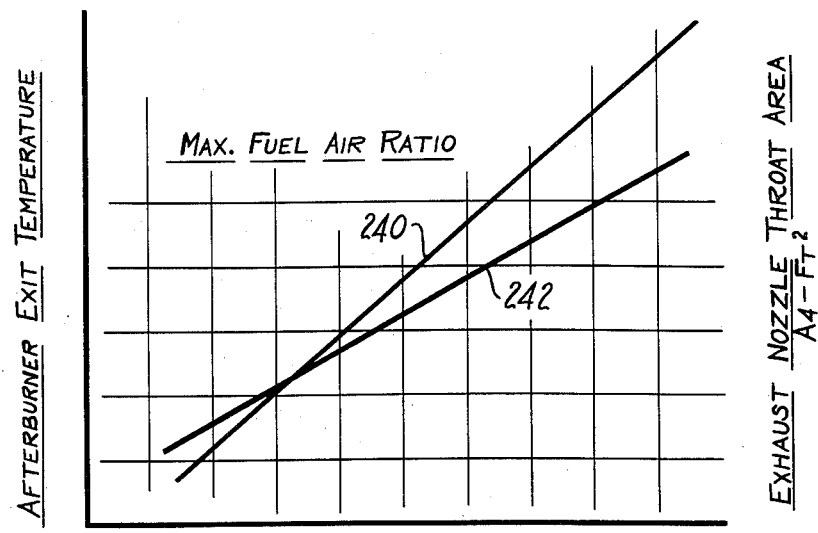
FIGURE 7 is a curve chart showing respectively the afterburner exit temperature and the exhaust nozzle throat area plotted as functions of compressor inlet temperature for a gas turbine engine.

In FIGURE 7 there is shown a curve chart illustrating respectively by curve 240 a plot of afterburner exit temperature as a function of compressor inlet temperature. Curve 242 shows a plot of exhaust nozzle throat area as a function of compressor inlet temperature.

In the operation of the apparatus shown in FIGURE 1 the Mach control apparatus 54 operates as a Mach number or flight speed governing control. The inputs to the control are the free stream impact or ram pressure supplied through the conduit 76, the cone or angular static pressure supplied through the conduit 78, ambient static pressure supplied through the conduit 79 which is exposed to the fluid medium or air surrounding the Mach control 54, the control fluid from the control fluid supply 146 and the input of the control throttle member 46 as supplied through the connecting arm 52. The main fuel control 28 is controlled by the speed responsive flyweights 40. Further, the main fuel control 28 may be controlled in accordance with the general teachings of the main fuel control shown in the copending application Serial No. 499,432, filed April 5, 1955 by H. J. Williams, F. R. Rogers and B. J. Ryder and assigned to the same assignee as the present application.

The afterburner control 58 is operative to control the supply of afterburner fuel to the afterburner fuel manifold 66 in response to the inlet pressure to the afterburner combustion chamber as sensed by the pressure responsive device 102, the area of the exhaust nozzle as sensed by the feedback connection 93 and as controlled by the nozzle area control 96 in response to the turbine inlet temperature as sensed by the temperature responsive member 100 and the fuel scheduling by the control throttle member 46 through the connecting arm 56.

Referring to FIGURE 2 the Mach control or governor 54 is operative to compare the actual condition of operation of the vehicle 10 shown in FIGURE 1 with the desired condition of operation as scheduled by the control throttle member 46, and is operative to take corrective action to eliminate any difference between said actual condition of operation and the desired condition of operation. In this respect the actual condition of operation is the flight speed or Mach number which is sensed as a pressure ratio by the sensing device 70 which pressure ratio is the Pitot or ram pressure relative to the cone or angular static pressure. This latter pressure ratio is a function of Mach number of propulsion speed as shown by the curve chart of FIGURE 4. If the fluid pressure within the fluid chamber 108 is considered to be at a pressure $P_x$, the ratio of Pitot or ram pressure relative to the pressure $P_x$ is a function of the bleed areas controlled by control needles 112 and 118. Since the control needle 118 provides an altitude bias and a proportional feedback for the governor action it can be assumed fixed for the present. The control needle 112 is positioned by the control throttle member 46 to provide a desired flight speed or Mach number selection. The control throttle member 46 through the second cam 158 simultaneously provides a fuel air ratio request to the control valve member 170. After the pilot has made a Mach number selection the position of the needle control valve 112 establishes the ratio of the ram pressure to the pressure $P_x$ of fluid chamber 108 at a substantially constant value regardless of flight speed or Mach number. The pressure ratio of ram pressure $P_{lo}$ to cone or angular static pressure $P_{co}$ is varying with flight or propulsion speed or Mach number therefore there is only one flight speed or Mach number at which the pressure $P_x$ of the fluid chamber 108 is equal to the cone or angular static pressure $P_{co}$ within the interior of the first control bellows member 110 such that the control bellows member 110 is thereby balanced. For a lesser flight speed or Mach number the fluid pressure $P_x$ within the fluid chamber 108 is less than the cone static pressure and the control valve 138 will open or be positioned away from the valve seat 148 such that the pressure within the interior of the control bellows member 142 will be thereby decreased. For higher Mach numbers the pressure $P_x$ within the fluid chamber 108 will be greater than the cone static pressure such that the control valve member 138 will be seated against and thereby close the valve seat 148 such that the pressure within the interior of the control bellows member 142 will thereby increase. The latter increase in pressure within the control bellows member 142 will cause said bellows member 142 to lengthen such that the control lever 152 will pivot about the connection with the support member 154 to thereby decrease the fuel air ratio request by moving the control valve member 170 in a closing direction. Proportionality is obtained by modifying the pressure $P_x$ within the fluid chamber 108 as a function of the length of the control bellows member 142. This is accomplished by the compression spring 162 and the bell crank 164 which pivots around the connection 166 to move the control lever 122 and thereby adjust the position of the control needle valve 118 to modify the pressure $P_x$ within the fluid chamber 108 by varying the area of the bleed controlled by the needle valve 118. The evacuated second bellows control member 126 is located within the fluid chamber 128 containing fluid at ambient pressure or at the pressure adjacent the control 54 due to the provision of the opening or conduit 79. The second bellows member 126 also acts to position the control lever 122 to thereby position the needle valve member 118 to modify the range of propulsion speed or Mach number selection available to the control throttle member 46 as a function of vehicle altitude or fluid medium density.

The bellows stop member 134 makes this altitude operative control bias ineffective above a predetermined vehicle altitude or below a predetermined fluid medium density.

The curve chart shown in FIGURE 3 illustrates the engine thrust as shown by curve 180 and the vehicle or aircraft drag as illustrated by the curve 182 as functions of propulsion speed or Mach number. The separation between the curve 180 and the curve 182 illustrates the amount of thrust available for acceleration and control of the aircraft. The arbitrarily positioned vertical lines 181, 183 and 185 respectively illustrate the operation of the control throttle member 46 as shown in FIGURE 1 to control the propulsion speed or Mach number of the vehicle.

In the operation of the apparatus shown in FIGURE 5 the fuel is supplied to the fuel nozzles 22 for the main combustion chambers 20 as a function of engine speed. The engine speed responsive fly-weight members 40 are operative to control the action of the fuel metering valve 190 as a function of engine speed. The by-pass valve member 194 is operative to regulate or control the pressure drop or head across the fuel metering valve 190. It is to be understood that the main fuel metering valve 190 may be controlled by other engine operating parameters than engine speed as more fully disclosed and described in the above referred to copending application Serial No. 499,432, filed April 5, 1955.

In the operation of the apparatus shown in FIGURE 6 the afterburner fuel as supplied to the afterburner fuel manifold 66 is controlled as a function of exhaust nozzle throat area, as a function of flight speed or Mach number, and turbine outlet pressure or afterburner inlet pressure, and as a function of control throttle scheduling. In this respect the afterburner fuel control metering valve 216 is connected between the afterburner fuel supply pump 60 and the afterburner fuel manifold 66. The control valve member 218 of the afterburner fuel metering valve 216 is moved axially as a function of exhaust nozzle throat area by virtue of the connection 93 to the control piston 90 which in turn controls the throat area of the exhaust nozzle. The control valve member 218 is rotationally controlled as a function of turbine exhaust pressure or afterburner combustion chamber inlet pressure through the control valve 232. The movable valve member 236 of the control valve 232 is positioned as a function of the physical position or scheduling of the control throttle member 46 as shown in FIGURE 2 and as a function of propulsion speed by means of the free stream impact or ram pressure through the conduit 76 and the cone static or angular static pressure through the conduit 78.

In this respect the gas flow through the gas turbine 12 for the purpose of controlling the afterburner fuel flow is measured as a function of the exhaust nozzle throat area and the afterburner combustion chamber inlet pressure. The previous practice was to utilize a temperature measurement for the purpose of measuring the gas flow through a gas turbine engine, however it is very difficult to accurately measure a temperature in this manner. The curve chart of FIGURE 7 shows that the exhaust nozzle throat area has a very similar variation relationship relative to compressor inlet temperature as the afterburner exit temperature and accordingly for maximum power conditions the afterburner exit temperature can be assumed to be approximately a function of the nozzle throat area in this regard. Therefore the fuel flow to the engine can be reasonably controlled as a function of the afterburner combustion chamber inlet pressure and the exhaust nozzle throat area.

The operation of the main fuel control 28 is correlated relative to the operation of the afterburner fuel control 58 in the following manner: The exhaust nozzle throat area is controlled by the nozzle area control 96 in response to turbine inlet temperature as sensed by the temperature responsive device 100. As the turbine inlet temperature increases, the nozzle area control 96 is operative to increase the exhaust nozzle throat area which in turn increases the engine speed such that the speed responsive fly-weights 40 are thereby operative to decrease the fuel supplied to the main combustion chambers 20 by the main fuel control 28 to thereby decrease the inlet temperature of the turbine 16. In this manner any change in fuel flow requested by the control throttle member 46 results in a change in the exhaust nozzle throat area as necessary to limit the maximum inlet temperature to the turbine unit 16. It should be noted here that a change in afterburner fuel will change the exhaust nozzle throat area which in turn will request a further change in afterburner fuel. The latter and second change however is about 25 percent of the former and first change, and as a result the afterburner fuel change due to nozzle area quickly nulls out. Also the inlet pressure to the afterburner combustion chamber will remain relatively constant in order to maintain the operating point of the gas turbine during a change in afterburner fuel supply.

The afterburner fuel control 58 may operate respecting other control parameters and the like in accordance with the general teachings of copending application Serial No. 555,882, filed December 28, 1955, now abandoned, by T. B. Card, F. R. Rogers, and R. R. Riggs and assigned to the same assignee as the present application.

Several embodiments of the present invention have been schematically illustrated and described, however, it will be apparent to those skilled in this art that various changes and modifications in the structure and relative arrangement of parts may be made to suit individual requirements without departing from the spirit and scope of the present invention. Also, it is to be understood that the metering valve 218 of FIGURE 6 is provided with a suitably regulated fuel pressure head or drop across the valve by means of regulating the output of the fuel pump 60 or by suitable head regulating means as well known to persons skilled in this art.

We claim:

1. In fuel control apparatus for a combustion engine, said engine including a combustion chamber and a variable area exhaust nozzle, said engine further including a source of fuel, said engine being connected to a vehicle for propelling said vehicle through a fluid medium, the combination of a first control device connected between said fuel source and said combustion chamber for controlling the supply of fuel to said combustion chamber, and a second control device responsive to the area of said exhaust nozzle and to the propulsion speed of said vehicle through said fluid medium, said second control device being connected to the first control device for controlling the operation of the latter said first control device as a function of said area and as a function of said propulsion speed.

2. In fuel control apparatus for a combustion engine, said engine being connected to a vehicle for propelling said vehicle through a fluid medium and including a combustion chamber through which said fluid medium passes, said engine being provided with a source of fuel and including a variable area exhaust nozzle, the combination of a first control device connected between said fuel source and said combustion chamber for controlling the supply of fuel to said combustion chamber, and a second control device connected to said first control device for controlling the operation of said first control device, said second control device being responsive to the propulsion speed of said vehicle through said fluid medium for controlling said fuel supply as a function of said speed and to the area of said exhaust nozzle for controlling said fuel supply as a function of said area, with said second control device being further responsive to the pressure of said fluid medium at the inlet to said combustion chamber for controlling said fuel supply as a function of said fluid medium pressure.

3. In fuel control apparatus for an engine, said engine including a combustion chamber and having a variable area exhaust nozzle and being adapted for propelling a vehicle through a fluid medium, said engine further including a source of fuel and a flow path for said fluid medium, the combination of a first control device connected between said source and said combustion chamber for controlling the supply of fuel to said combustion chamber, a second control device responsive to the area of said exhaust nozzle and responsive to the propulsion speed of said vehicle through said fluid medium for controlling the operation of said first fuel control device as a function of said area and as a function of said speed, said second control device being further responsive to the fluid pressure at a predetermined location along said flow path for controlling the operation of said first fuel control device as a function of said fluid pressure.

4. In fuel control apparatus for a gas turbine engine, said engine including a main combustion chamber and an afterburner combustion chamber and being connected to a vehicle for propelling said vehicle through a fluid medium, said engine being provided with a source of fuel and including a variable area exhaust nozzle and a flow path for said fluid medium, the combination of a first fuel control device connected between said source and the main combustion chamber for controlling the supply of fuel to said main combustion chamber, a second fuel control device connected between said source and the afterburner combustion chamber for controlling the supply of fuel to said afterburner combustion chamber, and a third fuel control device connected to one of said fuel control devices for controlling the operation of said one fuel control device, said third control device being responsive to the pressure of said fluid medium at a predetermined location along said flow path and being responsive to the propulsion speed of said vehicle through said fluid medium for controlling the operation of said one fuel control device as a function of said fluid medium pressure and as a function of said propulsion speed, said third fuel control device being further responsive to the area of said exhaust nozzle for controlling the operation of said one fuel control device as a function of said area.

5. In fuel control apparatus for a gas turbine engine, said engine including a main combustion chamber and an afterburner combustion chamber and being connected to a vehicle for propelling said vehicle through a fluid medium, said engine being provided with a soure of fuel and including a variable area exhaust nozzle, the combination of a first fuel control device connected between said source and the main combustion chamber for controlling the supply of fuel to said main combustion chamber, a second fuel control device connected between said source and the afterburner combustion chamber for controlling the supply of fuel to said afterburner combustion chamber, and a third fuel control device connected to the first fuel control device and the second fuel control device for controlling a first amount of fuel supplied to the main combustion chamber and a second amount of fuel supplied to the afterburner combustion chamber, said third fuel control device being responsive to the inlet pressure to said afterburner combustion chamber and being further responsive to the area of said exhaust nozzle and the propulsion speed of said vehicle through said fluid medium for controlling said first and second amounts of fuel as a function of said inlet pressure and said area and said propulsion speed.

6. In fuel control apparatus for a gas turbine engine, said engine including a main combustion chamber and an afterburner combustion chamber and being connected to a vehicle for propelling said vehicle through a fluid medium, said engine being provided with a source of fuel and including a variable area exhaust nozzle, the combination of a first fuel control device connected between said source and the main combustion chamber, said first fuel control device being responsive to the operative speed of said engine for controlling the supply of fuel to said main combustion chamber as a function of said engine operative speed, and a second fuel control device connected between said source and the afterburner combustion chamber, said second fuel control device being responsive to the propulsion speed of said vehicle through said fluid medium and to the area of said exhaust nozzle for controlling the supply of fuel to the afterburner combustion chamber as a function of said propulsion speed and as a function of said nozzle area.

7. In control apparatus for a combustion engine, said engine including a combustion chamber and being connected to a vehicle for propelling said vehicle through a fluid medium, said engine including an internal flow path for said fluid medium and being provided with a source of fuel, the combination of a first control device connected between said source and the combustion chamber for controlling the supply of fuel to said combustion chamber, said first control device being responsive to the pressure of said fluid medium at a predetermined location along said flow path for controlling the supply of fuel to said combustion chamber as a function of said fluid medium pressure, a control throttle member adjustable in physical position for scheduling a desired condition of engine operation, said control throttle member being connected to said first control device for controlling the supply of fuel to said combustion chamber as a function of said physical position, and a second control device responsive to the propulsion speed of said vehicle through said fluid medium and connected to the first control device for controlling the operation of said first control device as a function of said propulsion speed, said second control device being further responsive to the density of the fluid medium entering said flow path for controlling the supply of fuel to said combustion chamber as a function of said fluid medium density.

8. In control apparatus for an engine, said engine including a combustion chamber and being adapted for propelling a vehicle through a fluid medium, said vehicle including a source of fuel, the combination of a first control device connected between said fuel source and the combustion chamber for controlling the fuel flow to said combustion chamber, a second control device operatively connected to the first control device for controlling the operation of said first control device, said second control device including a first member responsive to the density of said fluid medium for controlling the fuel supplied to said combustion chamber by said first control device as a function of said fluid medium density, with said second control device including a second member responsive to the speed of movement of said vehicle through said fluid medium for controlling the fuel supplied to said combustion chamber by said first control device as a function of said vehicle speed, and a control throttle member connected to said first control device for controlling the operation of said first control device, said control throttle member being adjustable in physical position for controlling the supply of fuel to said combustion chamber as a function of the physical position of said control throttle member.

9. In fuel control apparatus for a gas turbine engine, said engine including a main combustion chamber and an afterburner combustion chamber and being connected to a vehicle for propelling said vehicle through a fluid medium, said engine being provided with a source of fuel and including an internal flow path through said combustion chambers for said fluid medium, said engine further including a variable area exhaust nozzle, the combination of a first fuel control device connected between said source and the main combustion chamber, said first fuel control device being responsive to the operative speed of said engine for controlling the supply of fuel to the main combustion chamber as a function of said engine speed, a second fuel control device connected between said source and the afterburner combustion chamber for controlling the supply of fuel to said afterburner combustion chamber, and a third control device responsive to the pressure of the fluid medium entering said afterburner combustion chamber and responsive to the area of said exhaust nozzle, said third control device being further responsive to the propulsion speed of said vehicle through said fluid medium, with said third control device being connected to the second control device for controlling the supply of fuel to said afterburner combustion chamber as a function of said propulsion speed and as a function of said nozzle area and further as a function of the pressure of the fluid medium entering said afterburner combustion chamber, and a control throttle member connected to said first and second fuel control devices for controlling the supply of fuel to respectively the main combustion chamber and the afterburner combustion chamber as a function of the physical position of said control throttle member.

10. In fuel control apparatus for a gas turbine engine, including a first combustion chamber and a second combustion chamber, said engine being connected to a vehicle for propelling said vehicle through a fluid medium, said engine being provided with a source of fuel and including an internal flow path for said fluid medium, said engine further including a variable area exhaust nozzle, the combination of a first fuel control device connected between said source and the first combustion chamber for controlling the supply of fuel to said first combustion chamber, said first control device being responsive to the operative speed of said engine for controlling the supply of fuel to the first combustion chamber as a function of said engine speed, a second control device connected between said source and the second combustion chamber for controlling the supply of fuel to said second combustion chamber, said second control device being responsive to the pressure of said fluid medium at a predetermined location along said flow path and to the area of said exhaust nozzle for controlling the supply of fuel to the second combustion chamber as a function of said fluid pressure and as a function of said nozzle area, said second control device being further responsive to the propulsion speed of said vehicle through said fluid medium for controlling the supply of fuel to the second combustion chamber as a function of said propulsion speed, and a control throttle member operatively connected to the first and second control devices, said control throttle member having an adjustable physical position for varying the fuel supplied to each of the first said second combustion chambers as a function of said physical position.

11. In control apparatus for a combustion engine, said engine being connected to a vehicle for propelling said vehicle through a fluid medium, said engine including a combustion chamber, a fuel source and a flow path for said fluid medium through said combustion chamber, the combination of a first control device connected between said fuel source and said combustion chamber for controlling the supply of fuel to said combustion chamber, a control fluid chamber containing a control fluid at a first pressure which first pressure varies as a function of the temperature of said fluid medium entering said combustion chamber, said control fluid chamber being operatively connected to said first control device for controlling the supply of fuel to said combustion chamber as a function of said first pressure, and a second control device responsive to the propulsion speed of said vehicle through said fluid medium and operatively connected to said control fluid chamber for varying said first pressure as a function of said propulsion speed.

References Cited in the file of this patent

UNITED STATES PATENTS

| | | |
|---|---|---|
| 2,642,237 | Page et al. | June 16, 1953 |
| 2,671,620 | Andrews | Mar. 9, 1954 |
| 2,724,947 | Meyer | Nov. 29, 1955 |
| 2,736,166 | Mock | Feb. 28, 1956 |
| 2,779,422 | Dolza et al. | Jan. 27, 1957 |
| 2,818,703 | Victor | Jan. 7, 1958 |
| 2,822,666 | Best | Feb. 11, 1958 |
| 2,844,936 | Fowler et al. | July 29, 1958 |
| 2,850,871 | Drake | Sept. 9, 1958 |

FOREIGN PATENTS

| | | |
|---|---|---|
| 731,524 | Great Britain | June 8, 1955 |